United States Patent [19]

Balasubramanian N.

[11] Patent Number: 4,505,578
[45] Date of Patent: Mar. 19, 1985

[54] BRAKED GRAVITY TRANSPORT FOR LASER READING AND WRITING SYSTEMS

[75] Inventor: Balasubramanian N., Saratoga, Calif.

[73] Assignee: Digital Optics Corporation, Sunnyvale, Calif.

[21] Appl. No.: 551,266

[22] Filed: Nov. 14, 1983

[51] Int. Cl.³ .................... G03B 27/32; H04N 5/84
[52] U.S. Cl. .................................. 355/43; 346/76 L; 355/53
[58] Field of Search ................... 355/43, 53, 77; 346/76 L; 358/293

[56] References Cited

U.S. PATENT DOCUMENTS

| | | | |
|---|---|---|---|
| 3,620,623 | 11/1971 | Reams et al. | 355/43 X |
| 3,797,935 | 3/1974 | Marcy | 355/53 |
| 3,999,010 | 12/1976 | Oosaka et al. | 358/302 |
| 4,225,224 | 9/1980 | Balasubramanian | 355/77 |
| 4,285,012 | 8/1981 | Ohara et al. | 358/293 |
| 4,358,198 | 11/1982 | Moriyama et al. | 355/53 |

*Primary Examiner*—Donald A. Griffin
*Attorney, Agent, or Firm*—Thomas Schneck

[57] ABSTRACT

A transport for a laser writing and reading system in which a carriage is propelled by a falling mass, either its own or an auxiliary mass. The falling mass works against a hydraulic cylinder and piston in which hydraulic fluid is displaced from the cylinder. A valve limits the flow of hydraulic fluid out of the cylinder so that the fall of the mass, and hence the carriage is braked to a uniform velocity. The system also includes a laser having a beam for scanning in a line transverse to the direction of motion of the carriage. A photosensitive medium is disposed to receive the scanning radiation. Either the laser or the photosensitive medium may be mounted on the carriage, with the other mounted in the fixed position in optical communication therewith. By controlling the rate of fluid flow through the valve, the mass will fall with uniform velocity, thereby propelling the carriage at a uniform, vibration-free rate.

38 Claims, 6 Drawing Figures

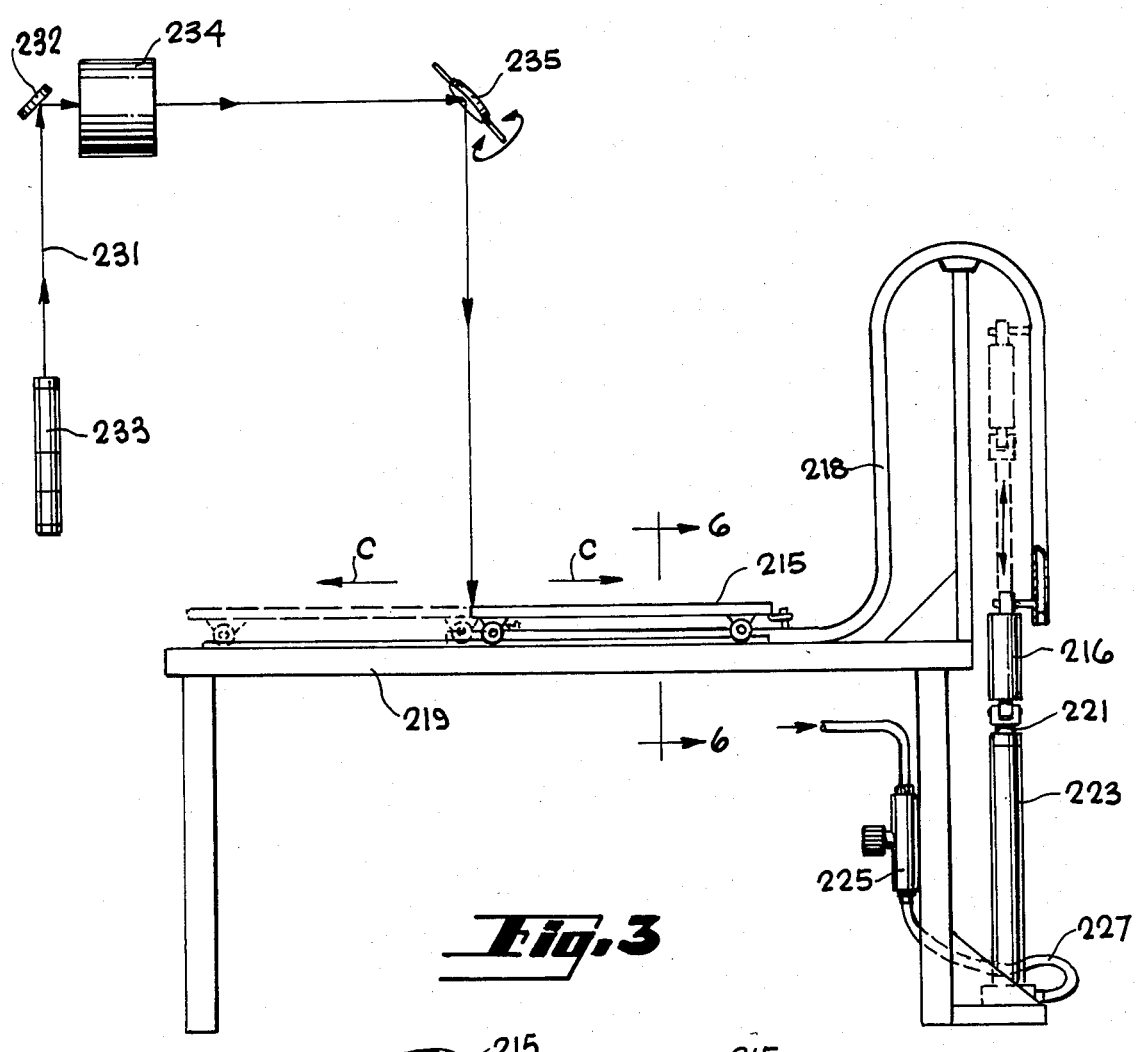
_Fig.3_
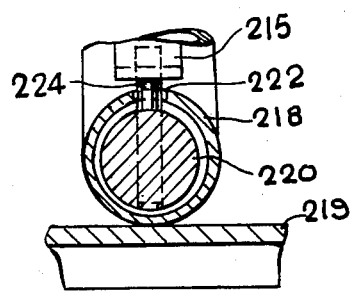
_Fig.4_ _Fig.5_
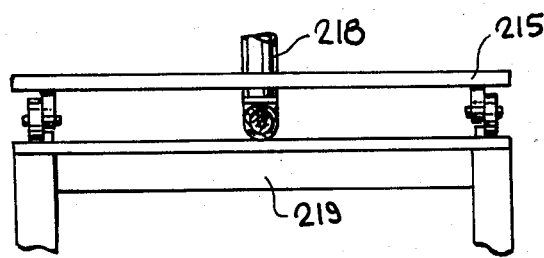
_Fig.6_

BRAKED GRAVITY TRANSPORT FOR LASER READING AND WRITING SYSTEMS

TECHNICAL FIELD

The invention relates to laser writing and reading systems and in particular to apparatus for providing relative motion between a laser beam and photosensitive media.

BACKGROUND ART

Because of the dramatic drop in cost of computer memory, it is becoming more economical and efficient to store film data in computer archival storage than in the film media itself. For example, in a large hospital hundreds of X-ray images are made every day. In the past these X-ray films were often stored indefinitely. It has been recognized that computer storage of such films is preferable if an image can be read and reconstructed with accuracy. Computer storage of such images is accomplished by laser writing and reading systems.

Laser writing and reading systems are known. For example, see U.S. Pat. No. 4,225,224 to N. Balasubramanian. Such systems commonly use photosensitive media for pre-recorded data being read or for writing new data. In either case, it is typical that a laser beam must rapidly scan the media, which is either reflective or transmissive of laser light.

The laser beam usually scans the medium by means of scanning optics, typically a scanning mirror or a rotating polygonal wheel having reflective surfaces. Such scanning is along a line extending across the width of the medium. To attain areawise media coverage, the medium is advanced relative to the beam, preferably in synchronism. Once a line has been scanned, the medium, usually film, is incrementally advanced a slight distance and an adjacent line is scanned. This is usually accomplished by mounting the film on a drum and rotating the drum by a slight amount after each line scan. Rotation is carried out by a stepper or other type of motor until the entire film has been scanned.

A problem with this approach is that the motor introduces a slight amount of vibration to the film, no matter how smooth the motor may be. This vibration causes film jitter which is seen on the film as lines, sometimes interfering with the ability to read data. In all cases it is easier to read data when there is no mechanical vibration of the film.

An object of the invention was to devise a means and method for reading and writing upon photosensitive media where the effects of vibration are substantially reduced.

SUMMARY OF INVENTION

The above object has been achieved with a method and apparatus of providing relative motion between a scanning beam and a photosensitive medium which is virtually free from vibration. Rather than advancing film by means of motors or the like, the present invention relies on gravity for providing a vibration-free force to obtain relative motion. Yet gravity alone is insufficient because gravity provides acceleration. For film scanning, a uniform velocity is required so that the scan position can be accurately known. In the present invention a hydraulic brake is used to place drag on falling mass associated with a carriage carrying either the photosensitive medium or the read/write optical system.

Briefly, a mass associated with a carriage is supported over a hydraulic cylinder and piston, the cylinder containing hydraulic fluid. The mass falls downwardly in the earth's gravitational field, working against the piston. A valve is connected to the hydraulic cylinder metering the flow of hydraulic fluid from the cylinder due to work done by the piston. The rate of fluid flow is such that the valve acts as a brake limiting the rate of fall of the piston and hence the carriage. If the read/write optical system is mounted on the carriage, the photosensitive medium is mounted in a fixed position in optical communication therewith, or vice-versa.

The falling mass and hence the carriage is free from detectable vibration as measured on the photosensitive medium. While formerly vibration manifested itself in the form of faint lines streaking the medium resembling a raster effect, the present invention shows no similar lines and enhances the signal-to-noise ratio of laser written and read data.

BRIEF DESCRIPTION OF THE DRAWINGS

FIG. 3 is a side view of a third embodiment of the present invention.

FIG. 4 is a detail of a carriage propelling assembly used in the apparatus of FIG. 3.

FIG. 5 is a side view of the detail illustrated in FIG. 4.

FIG. 6 is a sectional view of the apparatus shown in FIG. 3, taken along lines 6—6.

BEST MODE FOR CARRYING OUT THE INVENTION

Figure 1:
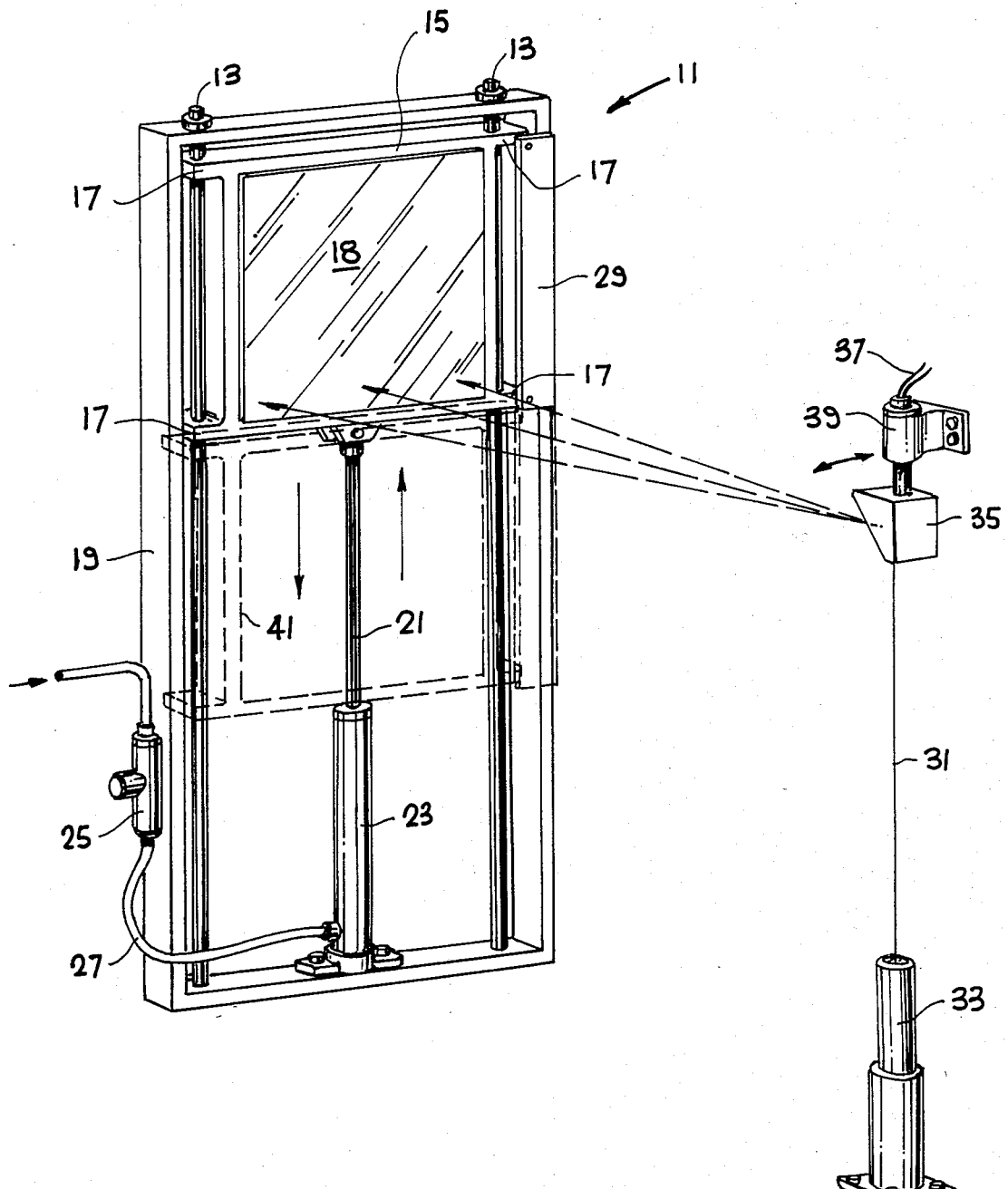
FIG. 1 is a perspective view of a first embodiment of the present invention.

With reference to FIG. 1, a transport 11 may be seen which includes a carriage 15 mounted between and guided by parallel, spaced-apart rails 13. Carriage 15 includes a rectangular frame adapted for carrying material, such as a photosensitive medium 18 which occupies the central portion of the carriage. The frame is connected to rails 13 by means of bosses 17 which project outwardly from the rectangular portion of the frame. The bosses have apertures with internal bearings for sliding along rails 13 with a minimum amount of vibration. In turn, rails 13 are supported within a box-like structure 19 which maintains the spacing and positioning of the rails. Carriage 15 has an associated mass. This mass may be the carriage's own mass derived from the carriage material or may be an auxiliary mass such as a weight connected to the carriage.

The mass associated with the carriage is intended to fall in the earth's gravitational field and work against a piston 21 which has a movable end within cylinder 23. This cylinder is filled with hydraulic fluid below the piston which is forced out of the cylinder when the piston falls. The hydraulic fluid may be a gas, but is preferably a liquid. Adjustable valve 25 is connected to cylinder 23 by means of line 27. The purpose of valve 25 is to limit fluid flow from the cylinder to a desired, steady flow which may be accurately adjusted. The rate of flow is such that the rate of fall of the mass associated with the carriage is braked by the valve. This may be done by providing a needle valve wherein a movable needle controls the size of an orifice through which fluid flows. By means of very small orifices, the rate of fall of the carriage may be limited. It is important to have an adjustable orifice so that the rate of fall of the carriage may be synchronized with the scanning rate. A linear encoder 29 may be positioned adjacent to carriage 15. The position encoder 29 is fixed relative to structure 19. Typically, such position encoders have a lengthwise array of parallel equally spaced rulings which may be read optically as a marker on carriage 17 moves past the rulings. For example, black parallel lines on a transparent background may be read by a movable source and detector, crossing the lines. As lines are crossed, light from the source is interrupted and the detector registers a pulse. Detectors of this type have resolutions on the order of hundredths of a millimeter. The output from such a device is an electrical signal representing the position of carriage 15 relative to encoder 29 which is fixed with respect to rails 13. This allows the position of the carriage to be known relative to the rails and relative to fixed members of the system.

The photosensitive medium 18 is scanned by a beam 31 generated by laser 33. The laser may be a low power helium-neon laser or any laser whose radiation is compatible with reading or writing on photosensitive medium 18. The beam is deflected by a galvanometer mirror 35, electrically driven by a motor 39 electrically controlled over wires 37. The manner of scanning with such a mirror is described in prior U.S. Pat. No. 4,225,224.

In operation, scanning is continuous in a horizontal line transverse to the direction of fall of the carriage. The velocity of the carriage is uniform since valve 25 is limiting the flow of fluid therethrough to a relatively low amount so that scanning of the film may be in synchronism with a data transfer rate from a computer or data storage device. Such a device provides signals which are modulated onto a laser beam 31 by a laser modulator, not shown. Mirror 35 is driven by galvanometer 39 at a known rate such that pixels on the photosensitive material 18 can be addressed at the data rate. The spacing of the pixels depends on the sensitivity of the film. For very sensitive film, such as aerial photography film, the pixels are closely spaced. On the other hand, pixels are more widely spaced when using low resolution film, such as medical X-ray film. A linear CCD array may be placed at lateral edges of the film for signalling lateral interception of the beam and causing reversal of the beam deflection. Ordinarily, edges of the scanning path are known from prior calibration and these limits are preset in the galvanometer. In either case, the vertical beam position on the photosensitive medium is known both from the linear encoder 29 and the position of the galvanometer mirror as signalled on lines 37.

While the laser 33 has been described above as a writing beam, a similar beam, without a modulator, could be used for reading a photosensitive medium, such as exposed and developed film. In this case, a detector is positioned behind medium 18. This detector may be an array of CCD cells. Linear arrays of CCD cells are presently commercially available. The linear density of detector elements in CCD linear arrays is over one thousand per inch. By means of calibration, the line for the linear array may be determined for a known rate of fall of carriage 15. The amount of light transmission through the film gives an optical density reading, allowing digital storage of information on the photosensitive material for subsequent reconstruction.

For example, medical X-rays may be read by the apparatus of the present invention and the information stored on such X-rays may be placed in a mass storage unit associated with a digital computer. The mass storage unit is preferably of the archival type, suitable for very long-term storage. The original photosensitive medium, after having been read, may be salvaged. In the case of X-ray film, any silver thereon may be reclaimed.

After the carriage 15 falls and the photosensitive medium is scanned by beam 31 the carriage reaches the position indicated by the dashed lines 41. The carriage then may be reset by raising it, either manually, or by hydraulic means.

Figure 2:
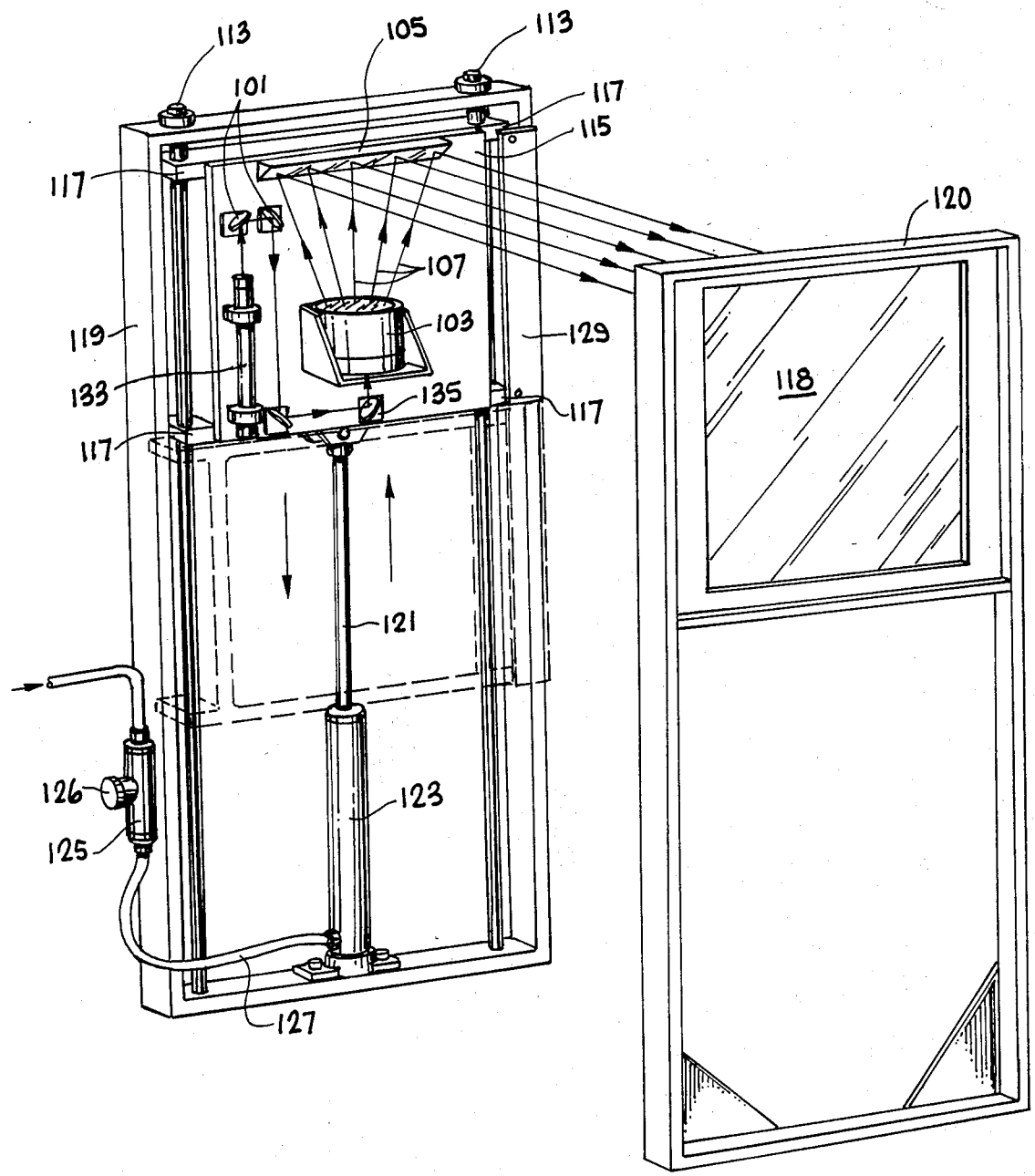
FIG. 2 is a perspective view of a second embodiment of the present invention.

With reference to FIG. 2, a reversal of the optical components may be seen. In this case, photosensitive medium 118 is stationary, being mounted on fixed holder 120, and the laser 133 and associated optics are mounted on movable carriage 115. The important consideration is that either the laser or the photosensitive medium be mounted on the carriage and the other mounted in a fixed position relative to the other and in optical communication with the other. In this case, laser 133 directs light toward mirrors 101 and ultimately to the scanning galvanometer mirror 135. A condensing lens 103 directs the light to an elongated prism 105 where the light is reflected toward photosensitive medium 118. The prism should have a length sufficient to accommodate the full width of the deflected beam indicated by arrows 107. The laser associated optics are fastened to a panel which in turn is mounted on carriage 115. As previously mentioned, the carriage is mounted on rails 113 by means of bosses 117 having internal ball bearings in contact with the rails. A position encoder 129 signals the relative position of the carriage with respect to the support structure 119.

Piston 121 supports the mass of the carriage. In turn, the piston is supported by fluid within a hydraulic cylinder 123. Hydraulic cylinder 123 has an exit port allowing escape of hydraulic fluid through line 127 to valve 125. An adjustable needle valve 126 controls the escape of hydraulic fluid due to the mass associated with the carriage pushing down on piston 121.

In operation, carriage 115 is allowed to fall under the influence of the earth's gravitational field. The mass of the carriage pushes downwardly on piston 121, causing displacement of hydraulic fluid from cylinder 123 through tube 127 and through valve 126. The needle valve is adjusted so that escape of fluid occurs at a rate such that the downward fall of the piston 121 is braked and the carriage falls at a uniform velocity. If the carriage were not braked, it would fall with acceleration due to gravity. Such acceleration would prevent the laser beam from writing or reading the photosensitive medium at a uniform rate. Thus, the braking action of the hydraulic cylinder serves to produce uniform writing on a photosensitive material without the mechanical vibration inherent in motors. The motion associated with the transport of the present invention is extremely smooth and free of mechanical vibration, except that which is picked up from the surrounding environment. To minimize such effects, shock mountings may be used of the type used to support laser optics. In many environments, this is not needed.

While the descriptions in FIGS. 1 and 2 show the carriage being vertically disposed, FIG. 3 illustrates a carriage which is horizontally disposed. With reference to FIG. 3, the carriage 215 is supported on a structure 219, such as a table. The table is shown as a simple table, but may be a vibration-free table of the type used to support optical benches. Such tables are sometimes massive slabs of stone supported on air-filled shock absorbers. Carriage 215 is connected to a mass 216 which is free to fall in the earth's gravitational field. A cable, within a slotted tube 218 connects the carriage to the mass. Mass 216 is connected to one end of a piston 221, having another end within cylinder 223. This cylinder is filled with hydraulic fluid below the piston which is displaced outwardly through tube 227 as the piston is pushed downwardly by the mass. An adjustable needle valve 225 limits fluid flow to a rate such that the mass 216 falls with uniform velocity.

A laser 233 is mounted in a relatively fixed position and has a beam 231 directed onto mirror 232 and focussing lens 234. A galvanometer mirror 235 is positioned for deflecting beam 231 downwardly onto a path transverse to arrows C which indicate the motion of carriage 215.

In FIG. 3, the carriage is intended to carry photosensitive media, such as film which is scanned by the deflected beam 231. However, the photosensitive medium could be placed in a fixed position and the laser mounted on the carriage, as in FIG. 2. In this situation, the movable beam would scan the fixed media.

With reference to FIGS. 4, 5 and 6, cable 220 is seen within tube 218. The tube has a slot 222 which is just large enough to accommodate a pin 224 which, on one side, is anchored within cable 220, and on the other side, is attached to carriage 215. Tube 218 is fastened to support structure 219 for a linear distance which defines the path over which the carriage moves. The carriage has wheels which are constrained to support structure 219 such that the carriage cannot lift therefrom when the tube 18 rises from the table. Also, the carriage wheels may be blocked at the end of the pre-defined path needed to allow scanning of the photosensitive medium by the beam. An optical encoder, not shown, provides positioning information of the carriage relative to the beam.

From the embodiment illustrated in FIGS. 3-6, it may be seen that the photosensitive medium or the optics may be horizontally disposed, while still using a braked gravity motion system. In using such a system, the faint lines on photosensitive media, indicative of vibrational streaking, evident in the prior art are no longer seen even though the photosensitive mediam is scanned in a raster pattern. Moreover, the present invention enhances a signal-to-noise ratio by more accurately locating pixels to be read or written.

What is claimed is:

1. A transport for moving photosensitive media relative to a beam in a laser reading and writing system comprising,
   a carriage associated with a mass, the carriage mounted for motion propelled by the mass falling in the earth's gravitational field, said carriage moving along a predefined path, pulled by the mass,
   braking means connected to the mass for braking the falling motion of the mass to a uniform velocity,
   a laser having optical means for scanning in a line, transverse to the direction of motion of the carriage, and
   a photosensitive medium disposed to receive said scanning line from the laser, either the laser or said photosensitive medium mounted on said carriage, the other mounted in a fixed position in optical communication with the first.

2. The transport of claim 1 wherein said braking means comprises,
   a piston having a first end connected to the carriage and a second end connected to a hydraulic cylinder with a fluid therein,
   valve means connected to the hydraulic cylinder for limiting the flow of fluid at a uniform rate, braking the fall of the carriage to a uniform velocity.

3. The apparatus of claim 2 wherein said valve means comprises a needle valve having a variable orifice through which said hydraulic fluid flows.

4. The apparatus of claim 1 further defined by laser means for scanning across said photosensitive medium in a line transverse to the direction of fall of said piston.

5. The apparatus of claim 4 wherein said laser means for scanning across said film includes means for measuring the beam position on the photosensitive medium.

6. The apparatus of claim 1 wherein said carriage comprises a base with lateral supports having bearings positioned to contact parallel opposed rails whereby said rails and bearings oppose rotational motion of the carriage.

7. The apparatus of claim 1 wherein an elongated position encoder is mounted proximate to said carriage, said position encoder having means for signalling the position of said carriage.

8. The transport of claim 1 wherein said laser is mounted on the carriage.

9. The transport of claim 1 wherein said photosensitive medium is mounted on the carriage.

10. The transport of claim 1 wherein said photosensitive medium is an unexposed photosensitive medium.

11. The transport of claim 1 wherein said photosensitive medium is an exposed and developed photosensitive medium.

12. The transport of claim 11 wherein a light detector is mounted to receive light reflected from the photosensitive medium.

13. The transport of claim 11 wherein a light detector is mounted to receive light transmitted through the photosensitive medium.

14. The transport of claim 1 wherein the carriage moves vertically.

15. The transport of claim 1 wherein the carriage moves horizontally.

16. A transport for moving photosensitive media relative to a beam in a laser reading and writing system comprising,
   a carriage vertically supported in the earth's gravitational field above a hydraulic cylinder and piston, said cylinder containing hydraulic fluid, said piston being connected to the carriage, said carriage transmitting its gravitational force to the piston such that the piston can fall downwardly,
   valve means connected to said hydraulic cylinder for limiting the flow of hydraulic fluid from the cylinder at a uniform rate such that the valve acts as a brake limiting the fall of the carriage to a uniform velocity,
   a laser having optical means for scanning in a line, transverse to the direction of fall of the carriage, and
   a photosensitive medium disposed to receive said scanning line from the laser, either the laser or said photosensitive medium mounted on said carriage, the other mounted in a fixed position in optical communication with the first.

17. The transport of claim 16 further defined by laser means for scanning across said photosensitive medium in a line transverse to the direction of fall of said piston.

18. The transport of claim 17 wherein said laser means for scanning across said film includes means for measuring the beam position on the photosensitive medium.

19. The transport of claim 16 wherein said carriage comprises a base with lateral supports having bearings positioned to contact parallel opposed rails whereby said rails and bearings oppose rotational motion of the carriage.

20. The transport of claim 16 wherein said valve means comprises a needle valve having a variable orifice through which said hydraulic fluid flows.

21. The transport of claim 16 wherein an elongated position encoder is mounted proximate to said carriage, said position encoder having means for signalling the vertical position of said carriage.

22. The transport of claim 16 wherein said laser is mounted on the carriage.

23. The transport of claim 16 wherein said photosensitive medium is mounted on the carriage.

24. The transport of claim 16 wherein said photosensitive medium is an unexposed photosensitive medium.

25. The transport of claim 16 wherein said photosensitive medium is an exposed and developed photosensitive medium.

26. The transport of claim 25 wherein a light detector is mounted to receive light reflected from the photosensitive medium.

27. The transport of claim 25 wherein a light detector is mounted to receive light transmitted through the photosensitive medium.

28. A transport for moving photosensitive media relative to a beam in a laser reading and writing system comprising,
a horizontally disposed carriage connected by a stiff cable to a mass vertically supported in the earth's gravitational field above a hydraulic cylinder and piston, said cylinder containing hydraulic fluid, said piston being connected to the mass, said mass transmitting its gravitational force to the piston such that the piston call fall downwardly,
valve means connected to said hydraulic cylinder for limiting the flow of hydraulic fluid from the cylinder at a uniform rate such that the valve acts as a brake limiting the fall of the mass to a uniform velocity,
a laser having optical means for scanning in a line, transverse to the direction of motion of the carriage, and
a photosensitive medium disposed to receive said scanning line from the laser, either the laser or said photosensitive medium mounted on said carriage, the other mounted in a fixed position in optical communication with the first.

29. The transport of claim 28 further defined by laser means for scanning across said photosensitive medium in a line transverse to the direction of fall of said piston.

30. The transport of claim 29 wherein said laser means for scanning across said film includes means for measuring the beam position on the photosensitive medium.

31. The transport of claim 28 wherein said valve means comprises a needle valve having a variable orifice through which said hydraulic fluid flows.

32. The apparatus of claim 28 wherein an elongated position encoder is mounted proximate to said carriage, said position encoder having means for signalling the position of said carriage.

33. The transport of claim 28 wherein said laser is mounted on the carriage.

34. The transport of claim 28 wherein said photosensitive medium is mounted on the carriage.

35. The transport of claim 28 wherein said photosensitive medium is an unexposed photosensitive medium.

36. The transport of claim 28 wherein said photosensitive medium is an exposed and developed photosensitive medium.

37. The transport of claim 28 wherein a light detector is mounted to receive light reflected from the photosensitive medium.

38. The transport of claim 28 wherein a light detector is mounted to receive light transmitted through the photosensitive medium.

* * * * *